United States Patent
Räsänen

(10) Patent No.: US 6,646,998 B1
(45) Date of Patent: Nov. 11, 2003

(54) MOBILE COMMUNICATION SYSTEM AND METHOD FOR ESTABLISHING A DATA CALL

(75) Inventor: Juha Räsänen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/043,702

(22) PCT Filed: Sep. 25, 1996

(86) PCT No.: PCT/FI96/00506

§ 371 (c)(1),
(2), (4) Date: Mar. 25, 1998

(87) PCT Pub. No.: WO97/12490

PCT Pub. Date: Apr. 3, 1997

(30) Foreign Application Priority Data

Sep. 25, 1995 (FI) .................................................. 954545

(51) Int. Cl.$^7$ ................................................ H04Q 7/00
(52) U.S. Cl. ...................................................... 370/328
(58) Field of Search ................................ 370/335, 468, 370/536, 465, 437, 310, 321, 337, 345, 442, 433, 431, 464, 474, 535, 537–545, 350, 503, 524, 522, 229–234, 351, 352, 328

(56) References Cited

U.S. PATENT DOCUMENTS

| 4,383,316 A | * | 5/1983 | Seidel ........................ 370/536 |
| 5,459,720 A | * | 10/1995 | Iliev et al. .................... 370/394 |
| 5,805,301 A | * | 9/1998 | Rasanen ...................... 370/536 |
| 5,828,666 A | * | 10/1998 | Focsaneanu et al. ........ 370/389 |
| 5,956,332 A | * | 9/1999 | Rasanen ...................... 370/468 |
| 6,128,322 A | * | 10/2000 | Rasanen ...................... 370/536 |

FOREIGN PATENT DOCUMENTS

| EP | 668 669 | 8/1995 |
| EP | 697 797 | 2/1996 |
| WO | 95/35002 | 12/1995 |

OTHER PUBLICATIONS

ETSI, ETS 300 501, European digital cellular telecommunications system . . . (GSM 02.02) pp. 1–13.
ETSI, ETS 300 557, (GSM 04.08, Version 4.21.0): Jan. 1998, pp. 423–431.
ITU–T, V.100, Data Communication Over the Telephone Network, pp. 1–6.
Mouley et al., The GSM System for Mobile Communications, International Standard Book No.: 2–9507190-0-7, pp. 216–259.
CCITT, ITU, v.110 (09/92), Data Communication Over The Telephone Network, pp. 1–58.
ITU–T, V.24, Data Communication Over the Telephone Network, pp. 1–19.
Patent Abstract of Japan 07135676 03,23,1995, M. Yahagi.

* cited by examiner

*Primary Examiner*—Dang Ton
(74) *Attorney, Agent, or Firm*—Pillsbury Winthrop LLP

(57) ABSTRACT

The present invention generally relates to data transmission services in mobile communication systems. A mobile subscriber may typically be entitled to different kinds of tele and bearer services. Presently, each user data rate is an independent bearer service. This means that there is a vast number of bearer services, which causes problems for both the network operators and the mobile subscribers. According to the invention, the number of bearer services is reduced by defining the bearer service to cover several data rates, and by negotiating, at the call set-up stage, the data rate to be used by the data call in the bearer service between the mobile station (MS) and the mobile communication network (MSC). The next step is to negotiate the data rate between the mobile communication network (MSC) and the fixed network, such as PSTN or ISDN. Then, if required, the data rate of the mobile communication network and the radio channel resources are adapted to the data rate used towards the fixed network.

11 Claims, 4 Drawing Sheets

MOBILE COMMUNICATION SYSTEM AND METHOD FOR ESTABLISHING A DATA CALL

FIELD OF THE INVENTION

The present invention generally relates to mobile communication systems and particularly establishing data calls employing different data rates and bearer services.

BACKGROUND OF THE INVENTION

In addition to conventional speech transfer, modern mobile communication systems provide their users with various kinds of data transfer features. The services provided by the mobile communication systems may generally be divided into Tele Services and Bearer Services. A bearer service is a telecommunication service which constitutes the transfer of signals between the user-network interfaces. As an example of bearer services, modem services are mentioned. In a tele service, the networks also provides terminal equipment services. Examples of major tele services, in turn, include speech, telefax, and videotext services.

The bearer services are usually classified into groups, such as asynchronous and synchronous bearer services, according to a characteristic feature. In an asynchronous bearer service, the transmitting and receiving data terminals only maintain their synchronization during each individual character to be transferred. In a synchronous bearer service, the transmitting and receiving data terminals are synchronized during the entire data transmission. Within each of such groups there is group of bearer services, e.g. a transparent service and a non-transparent service. In a transparent service, the data to be transferred are unstructured, and the transmission errors will be corrected by using channel coding only. In a non-transparent service, the data to be transferred are structured into service data units, and transmission errors are corrected (in addition to channel coding) by using automatic requests for retransmission. In addition, each user data rate is presently an independent bearer service. Therefore, there will be a hugely increased number of different bearer services. For example, the single channel data services of the Pan-European digital mobile communication system GSM (Global System for Mobile Communication) now has 6 different asynchronous bearer services for the rates 300, 1200, 1200/75, 2400, 4800 and 9600 bit/s.

A mobile subscriber may typically be entitled to different kinds of tele and bearer services. He may, for example, have access to a speech service, telefax service and various kinds of data services that utilize bearer services. A mobile terminating or originating call may therefore require any of the aforementioned tele and bearer services, or combinations thereof, for which reason the correct service must be addressed to the mobile communication network. In the GSM mobile communication system, for example, call set-up signalling transmitted by a mobile station contains information on the required service in a specific BCIE (Bearer Capability Information Element). The mobile communication network may thus choose the appropriate service for the mobile originating calls. Calls originating from an ISDN (Integrated Services Digital Network) also contain a similar information element, indicative of the required service. If, however, the call originates -from or is routed via the public switched telephone network (PSTN), information on the service type of the call will not be transmitted to the mobile communication network. In such a case, the mobile communication network should be informed in some other way what type of a basic service is required by the call. A prior art solution to the problem is represented by a Multi Numbering Scheme in which a mobile subscriber has as many directory numbers as he has different services to which he wishes to receive incoming calls. In accordance with the multinumbering scheme, a calling subscriber dials the directory number of the mobile subscriber according to the desired service. In the GSM system, the services of the subscribers are determined in a subscriber's home location register (HLR), in which other subscriber information is also stored permanently. The HLR is also used for storing information on the mapping between the directory numbers and the services of the subscribers. In the HLR, a specific BCIE element indicating the type of a call and the network resources required for the call is also linked with the directory number (MSISDN).

For the network operator and the mobile subscribers, such a vast number of services causes confusion and trouble. In order for the mobile subscriber to be able to carry out data calls to applications of different rates, he must subscribe to several bearer services from the network operator. From the point of view of the network operator, it is in turn problematic that each user should require numerous directory numbers, which wastes the number space of the network. Furthermore, determining the services in the network databases consumes database capacity.

In the GSM network, for example, the problem is becoming more acute as the determining of high-rate HSCSD (High Speed Circuit Switched Data) data services, which employ multi-slot technique, increases the number of bearer services on top of the single-slot services already determined. Hence, it would be advantageous to both the network operators and the mobile subscribers if the number of different kinds of bearer services could be reduced.

A DISCLOSURE OF THE INVENTION

It is object of the present invention to provide a digital mobile communication network in which one determined bearer service can handle as many data rates as possible.

This object is obtained by a method of the invention for establishing a data call in a mobile communication system. The method is characterized by the steps of determining for a mobile subscriber at least one data call bearer service covering several user data rates, carrying out, upon establishing the data call between the mobile communication network and the mobile station, a user data rate negotiation for setting the user data rate to be used in the data transfer between the mobile station and the mobile communication network, allocating radio channel resources for the data call according to the user data rate negotiated, continuing call set-up to the second party of the data call.

The invention further relates to a digital mobile communication system which is characterized by comprising at least one data call bearer service which covers several user data rates and which is determined for the mobile subscriber at the subscriber database of the mobile communication network, a negotiation procedure between the mobile station and the mobile communication network, for negotiating during call set-up, a user data rate used in the data call for data transfer between the mobile station and the mobile communication network, call control, allocating radio channel resources according to said negotiated user data rate.

The number of bearer services required in a mobile communication network can be significantly reduced by the method of the invention by determining a bearer service to cover several or all the user data rates, and by negotiating between the mobile station and the mobile communication network, at the call set-up stage, the data rate to be employed by the data call in the bearer service. The next step is to determine the data rate between the mobile communication network and the fixed network, such as the PSTN or ISDN, i.e. the data rate of the second party in the data call. If required, the data rate of the mobile communication network and the channel resources of the radio path are then adapted to the data rate used in the direction towards the fixed network.

At the initial stage of call set-up, a negotiation on the user data rate takes place between the mobile station and the mobile communication network at the call set-up stage. The mobile communication network may consequently limit the call to employ such a data rate which it is able to support, by signalling a rate parameter in the BCIE at the call set-up stage. The mobile station and/or an application used in a data terminal equipment connected thereto may also limit the call to use a transfer rate it supports by signalling a similar rate parameter in the BCIE. The mobile subscriber can also limit the call to use a desired data rate by configuring the BCIE rate parameter via the user interface. Following this, the mobile communication network allocates the radio channel resources and the network adaptor the call desires, and establishes a connection to the fixed network.

At the next stage, the data rate between the mobile communication network and the fixed network is negotiated or identified. If the call is a modem call, the network adaptor allocated above is a data modem. In the invention, the network adaptor modem may, within the specific data rate limit, carry out a data rate handshaking with a fixed network data modem employing any data rate. This enables operation with applications of the fixed network that use different rates. Said rate limit means that the handshaken data rate is to be limited to a level lower than or equalling the data rate negotiated by the mobile station and the mobile communication network at the first stage. As soon as the data rate handshaking has been completed, the network adaptor modem informs of the data rate negotiated in the handshaking.

If the information is Unrestricted Digital Information (UDI) towards the ISDN network, the data rate employed towards the fixed network is recognized either from the traffic channel itself, ISDN signalling, or in any other suitable manner.

At the third stage of the call set-up procedure according to the invention, the data rate of the mobile communication network and the radio path channel resources, allocated at the first stage, are if need be adapted to the data rate used by the fixed network and handshaken or recognized at the second stage. If the handshaken or recognized user data rate is higher than the rate negotiated by the mobile station and the mobile communication network at the first stage, the call is released in the case of a transparent data call. If the data rate handshaken or recognized at the second stage is lower than the transfer capacity of channel resources allocated on the radio path at the first stage, surplus capacity is released and/or channel coding is changed for a better one, if possible. If the data rate handshaken or recognized at the second phase is as high as the rate agreed upon at the first stage, the channel resources of the radio path are maintained unchanged.

The present invention enables significant reduction in the number of bearer services. It is possible to determine, e.g., one asynchronous bearer service which can be used in initiating all asynchronous data calls regardless of whether the call is terminated as transparent or non-transparent or which the final data rate will be after the call set-up according to the invention. This means that only one directory number, and a matching BCIE, has to be allocated for the subscriber for an asynchronous bearer service (compared to six numbers presently). This, in turn, results in a corresponding saving of database capacity and network number space. In addition, it facilitates making mobile-terminating calls particularly, because the calling subscriber only needs to know one asynchronous data service number. In the same manner it is possible to bring other, previously separate bearer services under one bearer service or service class for example so that all asynchronous data services constitute a bearer service, PAD access constitutes a bearer service, and Packet access constitutes a bearer service

BRIEF DESCRIPTION OF THE DRAWINGS

In the following, the invention will be described by means of the preferred embodiments, with reference to the accompanying drawings, in which.

THE PREFERRED EMBODIMENTS OF THE INVENTION

The present invention can be used in all digital mobile communication systems that support several different types of data services having different data rates.

The present invention is particularly well suited for data transfer applications in the Pan-European digital mobile communication system GSM (Global System for Mobile Communications) and other GSM-based systems, such as DCS1800 (Digital Communication System), and the digital cellular system PCS (Personal Communication System) in the USA. The structure and operation of the GSM system are well known by a person skilled in the art, and they are specified in the ETSI (European Telecommunications Standards Institute) GSM specifications. Reference is also made to "GSM System for Mobile Communication" by M. Mouly and M. Pautet, Palaiseau, France, 1992; ISBN 2-9507190-07.

Figure 1:
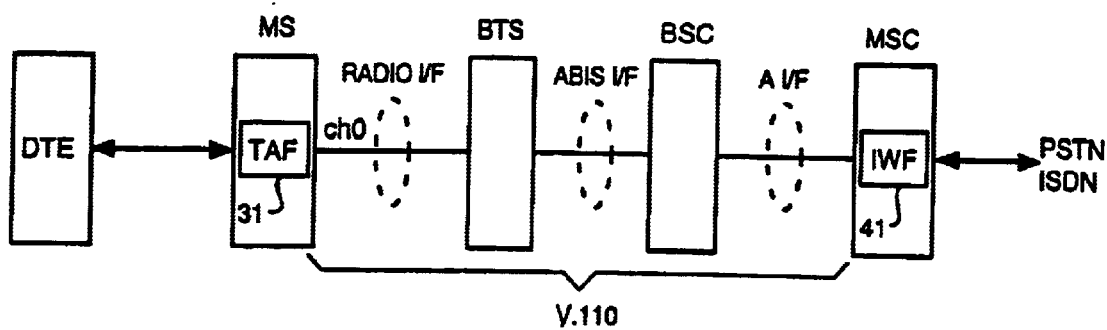
FIG. 1 illustrates a part of a mobile communication network in which the present invention may be applied.

The basic structure of the GSM system is illustrated by FIG. 1. The GSM structure consists of two parts: a base station system BSS and a network sub-system (NSS). The BSS and the mobile stations MS communicate over radio connections. In the BSS, each cell is served by a base station BTS. A group of base stations is connected to a base station controller BSC, whose purpose is to control the radio frequencies and channels used by the BTS. The BSCs are connected to a mobile services switching center MSC. Specific MSCs are connected to other telecommunication networks, such as the PSTN, and comprise gateway functions for calls to and from these networks. These MSCs are known as gateway MSCs (GMSC).

There are two main classes of databases, associated with routing the calls. A home location register HLR permanently or semi-permanently stores the subscriber data of all the subscribers of the network, including information on the services the subscriber may have access to, and on the subscriber's current location. The second register type is a visitor location register VLR. The VLR is usually associated with one MSC, but it may, however, serve several MSCS. It is common practice that the VLR is integrated into the MSC. The integrated network element is known as a visitor MSC (VMSC). Whenever the mobile station MS is active (registered and capable of making or receiving calls), the majority of the mobile subscriber information concerning the MS and stored in the HLR is copied to the VLR of the particular MSC in whose service area the MS is located.

Still referring to FIG. 1, a data link is established in the GSM system between a mobile station MS network terminal TAF (Terminal Adaptation Function) 31 and a network adaptor IWF (Interworking Function) 41 in the mobile communication network. In the GSM network, the data link in data transfer is a V.110 rate adapted, V.24 interface compatible, UDI coded digital Full Duplex connection. In this connection, the V.110 connection is originally a digital transmission channel developed for ISDN (Integrated Services Digital Network). The transmission channel adapts to the V.24 interface and also provides a possibility for transfer of V.24 statuses (control signals). The CCITT recommendation for a V.100 rate-adapted connection is specified in the recommendation CCITT Blue Book: V.110. The CCITT recommendation for a V.24 interface is disclosed in the CCITT Blue Book: V.24. The terminal adaptor TAF adapts a data terminal DT connected to the MS for the V.110 connection which is established over a physical connection using one or more traffic channels. The network adaptor IWF couples the V.110 connection to another V.110 network such as an ISDN or another GSM network, or to another transit network, e.g. the public switched telephone network PSTN.

As disclosed above, modern mobile communication systems support different kinds of tele and bearer services. The bearer services of the GSM system are specified in the specification GSM 02.02 version 4.2.0, and the tele services in the specification GSM 0.0.3 version 4.3.0.

Figure 2:
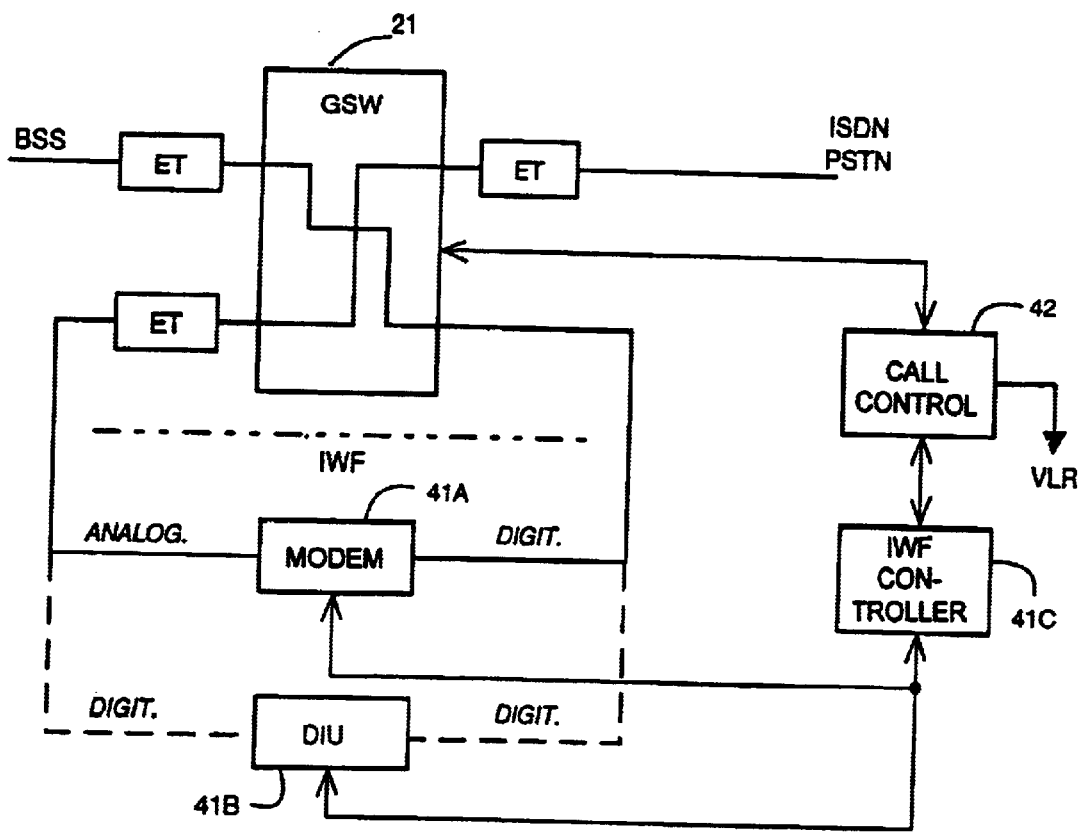
FIG. 2 shows a schematic block diagram of a mobile services switching center with an associated network-adaptor equipment IWF.

The network adaptor IWF is often placed at the MSC. FIG. 2 illustrates a network adaptor apparatus placed at the MSC, carrying out the adapting to the PSTN and the data services of the ISDN network. For adapting to the PSTN, an ISDN 3.1 kHz audio service or another GSM network, the IWF comprises a group of baseband data modems 41A, which also include a rate adaptor. The modems 41A are autobauding modems capable of handshaking any data rate supported by the GSM system between 300–9600 bit/s, or for HSCSD data services even higher transfer rates, for example 14.4–28.8 kbit/s. For reasons of clarity, FIG. 2 only shows one modem 41A, but any required number of them may be used. The analog side of the modem 41A is connected via an exchange termination ET and the digital side is connected directly to a group switch GSW21 in the MSC. In addition, via the exchange termination ET, digital transfer links to the base stations system BSS are coupled to the group switch 21. Furthermore, via the exchange terminations ET, the transmissions channels of other telecommunication networks, such as ISDN or PSTN, are coupled to the group switch 21. The adaptor apparatus of FIG. 2 further comprises, for adapting to the UDI, a data interface unit DIU 41B which contains a rate adaptor. The DIU is used in GSM calls to adapt the user data, rate adapted according to the V.110 recommendation, from the ISDN, as well as the status and control information according to the V.110 recommendation to the GSM traffic channel, and in the opposite direction, the user data from the GSM traffic channel as well as the status and control information to the V.110 frame structure of the ISDN. The ISDN side of the DIU 41B is connected via the exchange terminal ET, and the GSM side directly to the group switch GSW21. Although only one DIU 41B is shown in FIG. 2, there may be any number of them depending on capacity requirements. The group switch GSW21 and the network adaptor apparatus, as well as data call establishing, maintaining and releasing are all controlled by a call control 42. The operation of the IWF is controlled by an IWF controller 41C which, under control of the call control 42, connects a network adaptor, i.e. the modem 41A or DIU 41B, required by the bearer service used by a particular data call for the data connection. In FIG. 2, a solid line illustrates connecting the modem 41A, and a broken line illustrates connecting the DIU 41B. As an example of a mobile services switching center comprising such a network adaptor apparatus, the Nokia Telecommunication Ltd DX200 MSC can be mentioned.

As noted above, a mobile subscriber may traditionally have been entitled to different tele and bearer services each having a separate directory number MSISDN. In other words, each subscriber has had several MSISDN numbers. In addition, it has been necessary to determine every tele and bearer service of every subscriber in the subscriber's HLR in connection with other subscriber data, and to transfer them to the VLR. In the subscriber data, every MSISDN number is associated with a GSM system BCIE value, either directly or by means of an index pointing to a BCIE values chart. The BCIE is an information element used by the GSM system to transfer information on all the network requirements related to the call, such as transfer rates, number of data and end bits, etc. The BCIE is described in, for example, the GSM specification 04.08, version 4.5.0, pp. 423–431.

So far, every data rate has made up an individual bearer service. In the present invention, it is no longer necessary to determine every data rate required by the user as a bearer service in the subscriber data, but it is sufficient to determine only a few bearer service categories within which the subscriber has access to all the data rates supported by the GSM network. Accordingly, the bearer services in the subscriber data may be classified, for example, the following way: asynchronous services, synchronous services, PAD access and Packet access.

This is feasible by means of the tree-stage call set-up procedure according to the invention. At the first stage, the data rate is negotiated between the MS and the GSM network; at the second stage, the data rate to be used between the GSM network and the fixed network, such as PSTN or ISDN, is negotiated or recognized; and at the third stage, the channel type and/or channel coding to be used on the radio path (in a HSCSD service, also the number of radio channels required) are, if necessary, adapted to the final transfer rate employed by the call.

Figure 3:
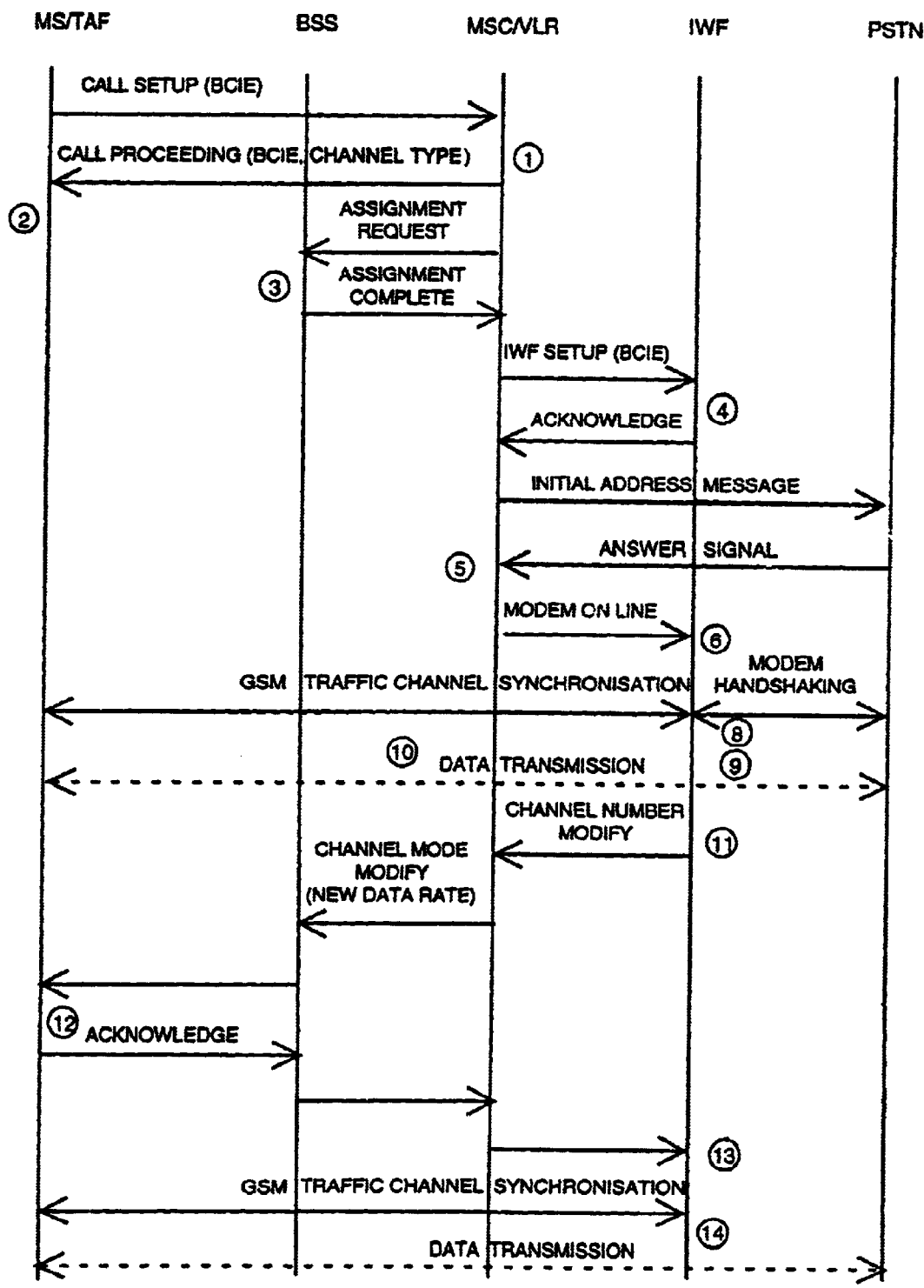
FIG. 3 is a signalling chart illustrating a mobile-originating modem call.
Figure 4:
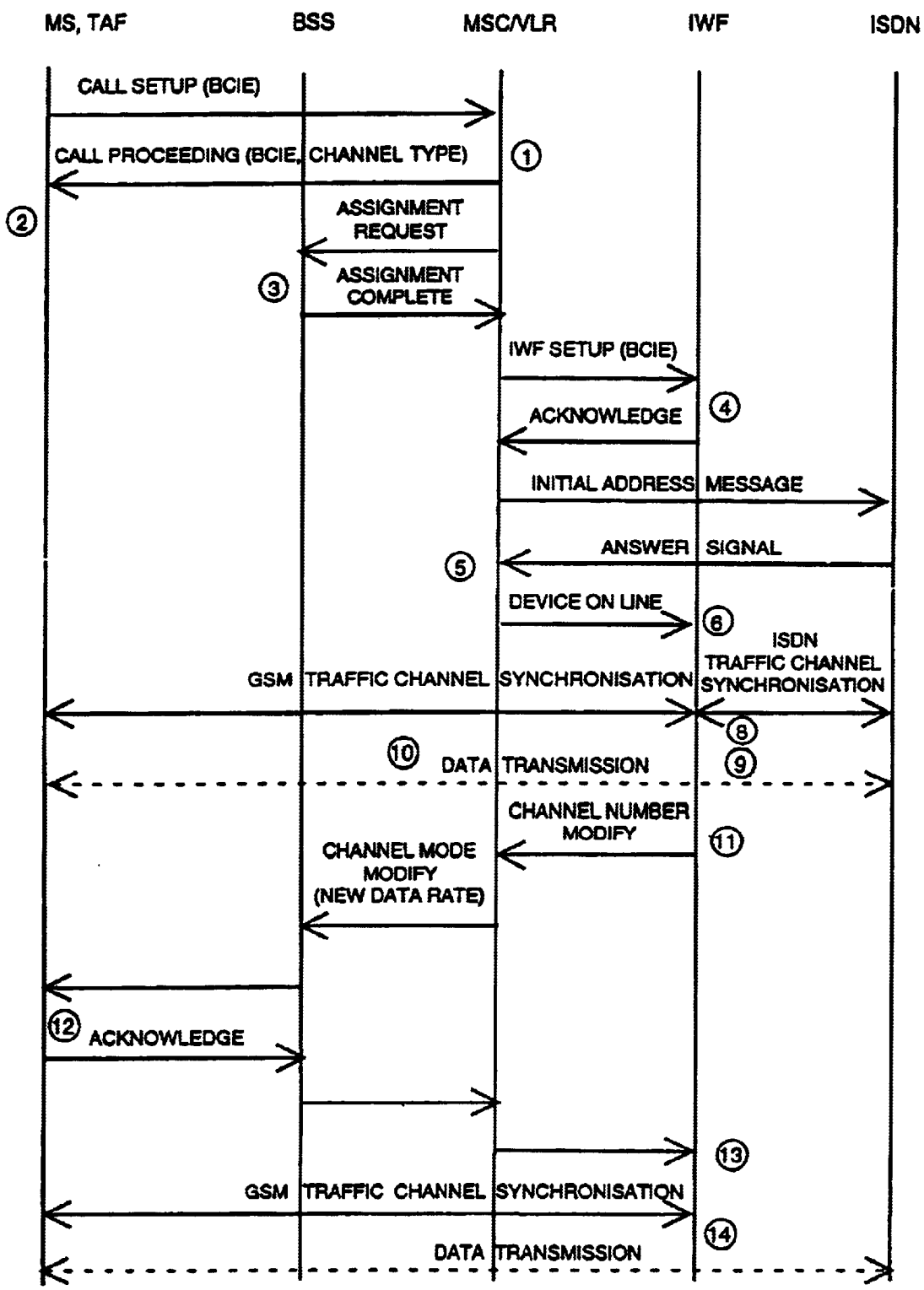
FIG. 4 is a signalling chart illustrating a mobile-originating UDI call.

The following will describe the call set-up of the invention in the cases of a mobile-originating (MO) modem call, a mobile-originating UDI call, and a mobile-terminating (MT) call with reference to FIGS. 3, 4 and, correspondingly, 5.

An MO Modem Call

With reference to FIG. 3, the MS initiates call set-up in an MO modem call by transmitting a CALL SETUP message, containing the BCIE element, to the MSC. The parameters of the BCIE indicate the service and the user data rate desired. Typically, the BCIE rate parameter is set by the MS, or the application used by a terminal equipment DTE connected to the MS, to a data rate it supports. It is also possible that the MS user limits the data call to a rate he desires by configuring the BCIE rate parameter through an MS user interface. The user may choose this course of action if, for example, he is aware that he is making a call to a slow-rate PSTN service, or if he knows that for his particular purpose a slow-rate service is more economical than a high-rate service.

Having received the CALL SETUP message, the MSC/VLR carries out a compatibility check and a Subscription check. In the latter, the MSC/VLR checks from the subscriber data whether the mobile subscriber is entitled to the service requested in the BCIE. In the compatibility check, the MSC checks whether it is able to support the service requested. If the MSC does not support the data rate requested by the MS due to its too high a level, the MSC reduces the data rate to a value it supports. If the MSC supports the data rate requested by the MS, it keeps the data rate at the same level. Following this, the MSC sends to the MS a CALL PROCEEDING message which indicates to the MS that the call is proceeding. This message also contains a BCIE element wherein a rate parameter is indicative of the data rate chosen by the MSC. In step 2, the MS checks the data rate indicated by the MSC. If the possibly altered data rate is not accepted by the MS, it may release the call. If the MS accepts the data rate, if configures itself for this data rate.

Following this, the MSC reserves a terrestrial connection and requests the BSS to allocate a required radio channel (channels) by an ASSIGNMENT REQUEST message. This message includes information on the resources required. The BSS allocates the radio channel, and if the MS tunes onto that channel, the BSS sends an acknowledgement to the MSC in an ASSIGNMENT COMPLETE message. Then, the MSC allocates required resources from the network adaptor IWF by transmitting an IWF SETUP message. The IWF acknowledges the procedure with an ACKNOWL-EDGEMENT message. In FIG. 2, allocating the IWF resources according to FIG. 3 (step 4) means that the call control 42 commands the IWF controller 41C to reserve the modem 41A.

Subsequently, the MSC initiates connection set-up to the called PSTN subscriber with an INITIAL ADDRESS message. The called PSTN subscriber connects his modem to the line and replies with an ANSWER SIGNAL message. The MSC directs the IWF modem onto the line with a MODEM ON LINE message (step 6). In FIG. 2 MSC this means that the call control 42 connects, by means of the GSW 21, the modem 41A between the transmission line from the BSS and the transmission line to the PSTN, as illustrated in FIG. 2. Following this, the GSM traffic channel becomes synchronized between TAF and IWF, and the IWF modem 41A begins handshaking on the data rate with the modem of the called PSTN subscriber. As noted regarding FIG. 2, the IWF modem 41A is able to handshake, within the rate limits, with a PSTN modem supporting any data rate. By means of the handshaking, it is possible to negotiate any data rate supported by the PSTN modem to be the data rate between the IWF modem 41A and the PSTN modem. In this manner, data calls to the fixed network applications that use different rates are made possible within the framework of one bearer service. Upon completion of the handshaking, the IWF modem 41A informs the IWF controller 41C of the handshaken data rate (step 8). If the handshaken rate is high enough, i.e. the same as the rate negotiated by the MS and the MSC, the IWF controller 41C directs the modem 41A to signal with traffic channel V.24 status (CT106, CT109) to the MS that the traffic channel is ready for data transfer (step 9). This is proceeded by a data transfer step 10.

If, however, the IWF controller 41C detects at step 8 that the data rate handshaken by the modems is too low compared to the channel resources allocated on the radio path according to the rate negotiated by the MS and the MSC, the IWF controller 41C requests a change to the number and/or type of channel from the MSC (call control 42). The above may comprise changing the channel coding into a more efficient one by applying a channel mode modify procedure, changing the channel type from a full-rate channel to a half-rate channel, or by reducing the number of traffic channels allocated for the connection (in a multi-slot transfer). This is illustrated by the messages CHANNEL NUMBER MODIFY and CHANNEL MODE MODIFY, and an acknowledgement message thereto, ACKNOWL-EDGE. Step 12 illustrates how the BSS releases superfluous channels, and the MS and the BSS alter the channel coding of the channels remaining in use suitable for the data rate. Step 13 exemplifies a case wherein, in case the user data rate remains lower than the transfer capacity of the number of channels required, the TAF and the IWF rate-adapt, according to the GSM specifications, the user data rate for the traffic channel capacity in use. Following this, the GSM traffic channel synchronizes, and the TAF and the IWF signal with the traffic channel V.24 statuses that the traffic channel is ready for data transfer, step 14. This is proceeded by the data transfer stage.

Mobile-originating (MO) UDI Call

The following will describe, with reference to FIG. 4, an MO type UDI call to the ISDN. Up to the answer signal message transmitted by the terminal equipment of the ISDN subscriber, and to step 5, the beginning of the call set-up in FIG. 4 occurs as described above with reference to FIG. 3. Following this, the MSC connects the required IWF resources by transmitting a "device on line", message to the network adaptor IWF. In the MSC of FIG. 2, this means that the call control 42 commands the IWF controller 416 to connect the DIU unit 41B, allocated above in step 4, onto the line. Consequently, the DIU is connected, via the group switch 21, between the transmission line from the BSS and the transmission line to the ISDN network, as illustrated by the broken line in FIG. 2. Following this, the GSM traffic channel will be synchronized between TAF—IWF, and the ISDN traffic channel will be synchronized between the IWF and the ISDN terminal equipment. Then, rate recognition of the ISDN traffic channel will be carried out according to the invention at step 8. If ISDN signalling is employed in which the BCIE element indicative of the user data rate is transferred, no other rate recognition will be required. According to the preferred embodiment of the invention, the transfer rate of an ISDN traffic channel is recognized by means of the IWF from the traffic channel itself. The data rate used is recognized from the octet bit use at the synchronization stage of the ISDN traffic channel. This means that the synchronization zeros (0) according to the recommendation ITU-T V.110 are noticeable in the used bits of the octet, while other bits in each octet are ones (1). According to the ITU-T V.110 recommendation, the data rate used by ISDN synchronous bearer services is coded in the E1, E2 and E3 bits of the V.110 frame used in the data transfer. The user data rate of asynchronous ISDN bearer services, in turn, can be found out from the ISDN traffic channel by the IWF monitoring the exchange of parameters by the terminal equipments, described in the ITU-T V.110 recommendation in the Appendix I, Inband Parameter Exchange, IPE. Recognition of a data rate of a traffic channel of an application or a telecommunication network which is external to the GSM network, when interconnection is implemented by direct and/or dedicated non-standardized interfaces, may take place by other than the aforementioned methods. As far as the invention is concerned, it is only essential that the data rate used in the UDI call is recognized. As soon as the IWF UDI 41B has recognized the data rate on the ISDN traffic channel, it informs the IWF controller 41C of, the rate. After that, the call set-up of FIG. 4 proceeds the same way as in FIG. 3 except that instead of the data rate handshaken by the modems, the recognized data rate mentioned above is now examined.

Mobile-terminating (MD) Data Call

Figure 5:
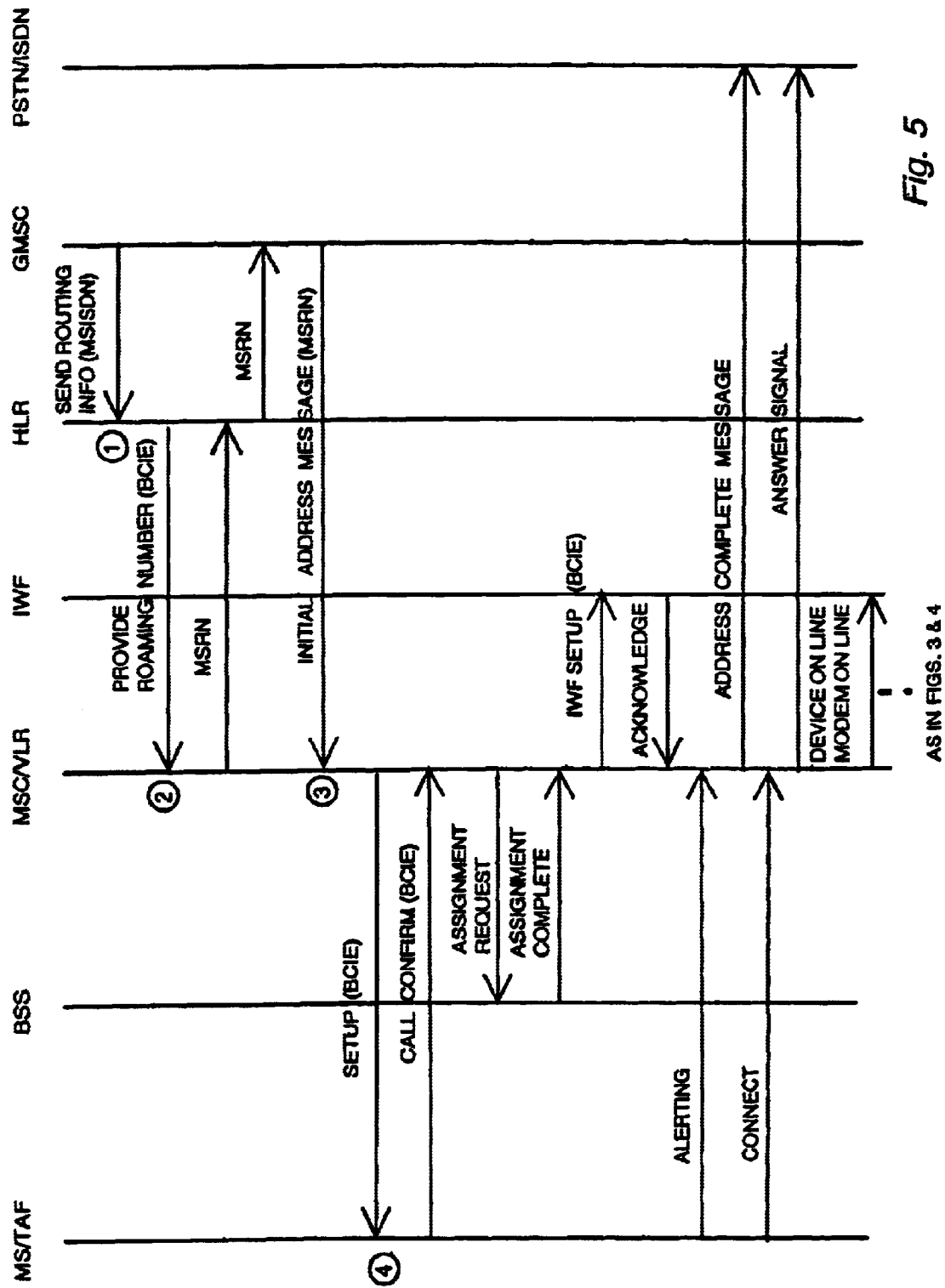
FIG. 5 is a signalling chart illustrating a mobile-terminating modem or UDI call.

In the following, with reference to FIG. 5, a mobile-terminating modem or UDI call will be described. The gateway MSC, GMSC, receives a call addressed to a directory number MSISDN of a GSM mobile subscriber. The GMSC requests routing information from the HLR by a "send routing info" message. The HLR retrieves from its database service information, i.e. the BCIE element, corresponding with the MSISDN. For example, it is assumed that an asynchronous 3.1 kHz bearer service is in question, covering in accordance with the invention all the data rates. After this, the HLR requests a roaming number from the VLR where, according to the subscriber data, the mobile subscriber is currently located. The same request message also transfers the BCIE element. The VLR stores the BCIE element and allocates a roaming number MSRN for the call. The MSRN is transmitted to the HLR which forwards it to the GMSC. On the basis of the roaming number, the GMSC routes the call to the MSC under control of which the mobile subscriber is located. In step 3, the MSC requests call set-up information from the VLR on the basis of the MSRN. On the basis of the MSRN, the VLR retrieves the BCIE which was previously received from the HLR, and transmits it to the MSC. At this stage, the MSC checks whether it supports the bearer service requested. If it does, it chooses the highest data rate it supports for the bearer service. The chosen user data rate is inserted as the value of the BCIE rate parameter in a call set-up message "setup" which is transmitted to the MS. In step 4, the MS checks whether it supports the bearer service requested and the chosen user data rate. If it does, it accepts the request as such. If the user rate is too high for the MS, it reduces the user rate to a level it supports. Then, the MS sets the user data rate it desires as the value of the rate parameter in the BCIE which is transmitted to the MSC in an acknowledgement message "call confirm". Following this, the MSC requests the BSS to allocate radio channels required with an "assignment request" message, and the BSS acknowledges with an "assignment complete" message. After this, the MSC allocates IWF resources required with a "setup" message, and the IWF acknowledges with an "acknowledgement" message. This is entirely identical with allocating IWF resources in FIGS. 3 and 4. The MS notifies with an "alerting" message that alerting of the called subscriber has been commenced. The MSC, in turn, uses an "address complete" message to inform the calling subscriber in the PSTN/ISDN network that the connection has been established. The MS then transmits a "connect" message indicative of the called subscriber accepting the call, which results in that the MSC transmits an "answer signal" message to the calling PSTN/ISDN subscriber. Following this, the modem or the rate adaptation is connected to the line, and call set-up is continued as in FIGS. 3 or 4 depending on whether the call is a modem call from the PSTN network or a UDI call from the ISDN network.

The following will deal with examples of a data call set-up in different call situations.

Example 1: an MO modem call, transparent, the PSTN determining the rate.. The MS initiates a data call by signalling in the set-up message BCIE the parameters: user rate=28.8, CE=transparent, ITC=3.1 kHz, modem type= autobauding. The MSC detects that it supports the service requested and that the subscriber is entitled to the bearer service requested. The MSC allocates the IWF resources and establishes a connection to the PSTN. A required number of radio channels will be allocated for the call; the user rate of 28.8 kbit/s requires three 9.6 kbit/s subchannels. The MSC configures the IWF modem into autobauding mode with 28.8 kbit/s as the maximum rate, without error correction protocol. The IWF modem and the PSTN modem hanshake for the rate 14.4 kbit/s, e.g. because the PSTN modem does not support any higher rates. The IWF takes into account the handshake result of the modems and informs the MSC of the new user rate 14.4 kbit/s. The MSC requests the BSS to reduce the number of subchannels used by the call into two, whereby the BSS releases one subchannel. The MS TAF and the IWF adapt the 14.4 kbit/s user rate into two 9.6 kbit/s subchannels.

Example 2: An MO modem call, transparent, the PSTN determining the rate. The MS signals in the set-up message BCIE the parameters: user rate=9.6, CE=transparent, ITC= 3.1 kHz, modem type=autobauding. The MSC detects that it supports the bearer service requested and that the subscriber is entitled to the bearer service requested. The MS allocates the IWF resources and establishes a connection to the PSTN. One 9.6 kbit/s channel will be allocated for the call. The MSC configures the IWF modem into autobauding mode with 9.6 kbit/s as the maximum rate, without error correction protocol. The IWF modem and the PSTN modem hanshake for the rate 4.8 kbit/s. The IWF takes into account the handshake result of the modems and informs the MSC of the new user rate of 4.8 kbit/s, and requests that the channel coding be made more efficient by a CMM procedure (Channel Mode Modify), or that the channel type be changed from a full-rate channel to a half-rate channel. In accordance with the GSM specifications, the IWF and the MS TAF adapt the 4.8 kbit/s user rate into the available traffic channel.

Example 3: An MO modem call, transparent, the MSC determining the rate. The MS signals in the setup message BCIE the parameters: user rate=28.8, CE=transparent, ITC= 3.1 kHz, modem type=autobauding. The MSC detects that it supports the 3.1 kHz bearer service only at the rate 9.6 kbit/s, or lower. The MSC further detects that the subscribeer is entitled to the bearer service requested. The MSC thereby signals a new rate of 9.6 kbit/s to the MS with the BCIE rate parameter of the call proceeding message. The MS accepts the new rate or releases the call. Then, the MSC allocates the IWF resources and establishes a connection to the PSTN. One 9.6 kbit/s GSM traffic channel will be allocated for the call. The MSC configures the moden into autobauding mode with 9.6 kbit/s as the maximum rate, without the error correction protocol. The IWF modem and the PSTN modem hanshake onto the same rate of 9.6 kbit/s, after which the IWF and the MSTAF transfer data at the user rate of 9.6 kbit/s.

Example 4. An MO UDI call, transparent, the ISDN determining the rate. The MS signals in the setup message BCIE the paramters: user rate=28.8, CE=transparent, ITC=UDI. The MSC detects that it supports the bearer service requested and that the subscriber is entitled to the bearer service requested. The MSC allocates the IWF resources and establishes a connection to the ISDN. A required number of radio channels, i.e. three 9.6 kbit subchannels are allocated for the call. The MSC configures the IWF rate adaptor DIU with 28.8 kbit/s as the maximum rate. Following this, the IWF detects, by any of the above ways, that the ISDN terminal equipment uses a different data rate, e.g. 19.2 kbit/s, and signals the new user rate of 19.2 kbit/s to the MSC. The MSC requests the BSS to reduce the number of GSM subchannels allocated for the call into two, whereby the BSS releases one GSM traffic channel. The IWF and the TAF adapt the 19.2 kbit/s user rate into two 9.6 kbit/s subchannels.

Example 5: An MO UDI call, transparent, the MSC determining the rate. The MS signals in the setup message BCIE the paramters: user rate=28.8, CE=transparent, ITC=UDI. The MSC detects that the subscriber is entitled to the bearer service requested, but the MSC itself only supports UDI bearer services at 9.6 kbit/s or lower rates itself. The MSC signals a new rate of 9.6 kbit/s to the MS in the "call proceeding" message BCIE. The MS accepts the new rate or releases the call. The MSC allocates the IWF resources and establishes a connection to the ISDN. If ISDN signalling support is available, the user rate of 9.6 kbit/s will be signalled to the ISDN. One 9.6 kbit/s GSM traffic channel will be allocated for the call. The MSC configures the IWF rate adaptor DIU with 9.6 kbit/s as the maximum rate. The IWF and the ISDN terminal equipment synchronize onto the rate 9.6 kbit/s. If ISDN signalling support is not available, the terminal equipments may negotiate a new rate using an in-band negotiation according to the recommendation V.110. The TAF and the IWF transfer data at the user rate of 9.6 kbit/s.

Example 6: An MT modem call, transparent, the PSTN/ISDN determining the rate. The MSC/VLR receives, either from the HLR or the PSTN/ISDN, a BCIE element comprising the setup parameters: user rate=28.8, ITC=3.1 kHz. The MSC detects that the subscriber is entitled to the bearer service requested. The MSC defines the BCIE parameters of the setup message to be transmitted to the MS as follows: modem type=autobauding, CE=Both NT, if the MSC supports both the transparent and the non-transparent data call. The MS specifies in the response message "call confirm" whether the call will be transparent or non-transparent by setting the BCIE parameter CE=T or CE=NT. In this example, a transparent connection CE=T is established. The MSC allocates the IWF resources and establishes a connection to the PSTN/ISDN. After that, the call seut-up procedure proceeds as in Example 1 after the PSTN connection set-up.

Example 7: An MT modem call, transparent, the MSC determining the rate. The MS receves, as in the example above, the BCIE setup parameters: user rate=28.8, ITC=3.1 kHz. The MSC detects that the subscribeer is entitled to the bearer service requested, but the MSC itself only supports 3.1 kHz bearer services at 9.6 kbit/s or lower rates. The VMSC sets the BCIE parameters of the setup message transmitted to the MS as follows: modem type=autobauding, CE=both NT, if the VMSC supports both the transparent and the non-transparent data service, and user rate=9.6 kbit/s. The MS specifies that the call will be transparent by setting the BCIE parameter CE=T in the call confirm message. The MSC allocates the IWF resources and establishes a connection to the PSTN/ISDN, after which call set-up will continue as in FIG. 2.

If the MS does not support in the data call as high a data rate as the MSC is requesting, the MS may change the user data parameter to a desired value in the "call confirm" message BCIE. The MSC in such a case will attempt a call set-up towards the fixed network at a rate determined by the MS.

Example 8: In a call which will finally result in a non-transparent call, the fixed network leg of the connection and the GSM network leg do not necessarily have to have equal data rates. Therefore, as far as the present invention is concerned, it is sufficient that the rate negotiation between the MS and MSC is accepted. From the point of view of saving radio channels it is, however, advantageous that radio channel resources not required are also released in a non-transparent call in case the rate offered by the fixed network is clearly below the user rate requested. The following is an exemplary case of a transparent MO modem call in which the PSTN determines the rate. The MS signals in the BCIE of the setup message the parameters: user rate 28.8, CE=both NT, ITC=3.1 kHz, modem type=autobauding. The MSC detects that it supports the service requested and that the subscriber is entitled to the bearer service requested. The MSC specifies the call to be non-transparent, allocates the IWF resources and establishes a connection to the PSTN. Required number of radio channels, i.e. three GSM subchannels, are allocated for the call. The MSC configures the IWF modem into autobauding mode in which the use of error correction and compression protocol is allowed. The IWF modem and the PSTN modem handshake at the rate of 14.4 kbit/s without the compression protocol. The IWF takes into account the result handshaken by the modems, and informs the MSC of the new user rate of 14.4 kbit/s. The MSC requests the BSS to reduce the number of subchannels reserved by the data call from three into two, whereby the BSS releases a GSM traffic channel. The TAF and the IWF adapt the 14.4 kbit/s user rate into two 9.6 kbit/s subchannels by using the radio link protocol (RTP).

It should also be noted that in all the exemplary cases the MSC may signal the new user rate employed by the fixed network to the MS which may, if it desires, to release the call.

The Figures and the description related thereto are only intended to illustrate the present invention. The present invention may vary in details within the scope of the attached claims.

What is claimed is:

1. A method for establishing a data call in a mobile communication system, comprising:

determining for a mobile subscriber at least one data call bearer service covering several user data rates;

carrying out, upon establishing the data call between a mobile communication network and a mobile station, a user data rate negotiation for setting the user data rate to be used in the data transfer between the mobile station and the mobile communication network;

allocating radio channel resources for the data call according to the user data rate negotiated;

continuing call set up to a second party of the data call;

determining the user data rate of the second party in the data call;

allowing for the second party in a transparent call the user rate which is lower than or equal to said negotiated user rate; and changing in a transparent call the negotiated data rate between the mobile station and the mobile communication network to match the user rate of the second party in case the user rate of the second party is lower than said negotiated user rate.

2. A method for establishing a data call in a mobile communication system, comprising:

determining for a mobile subscriber at least one data call bearer service covering several user data rates;

carrying out, upon establishing the data call between a mobile communication network and a mobile station, a user data rate negotiation for setting the user data rate to be used in the data transfer between the mobile station and the mobile communication network;

allocating radio channel resources for the data call according to the user data rate negotiated;

continuing call set up to a second party of the data call;

determining the user rate of the second party in the data call; and adapting radio channel resources allocated on the basis of said negotiated user data rate at the beginning of the call set-up, according to the user rate of the second party, wherein said adapting of the radio channel configuration comprises at least one of the following:
reducing the number of traffic channels allocated for the call;
changing a channel coding; and
changing a channel type.

3. A method as claimed in claim 1, wherein the negotiation between the mobile station and the mobile communication network further comprises agreeing whether the data call will be transparent or non-transparent.

4. A method as claimed in claim 1, further comprising:

defining, for the mobile subscriber, at least one of the following data call bearer services, each covering several user rates: an asynchronous bearer service, a synchronous bearer service, a PAD access bearer service, or a Packet access bearer service.

5. A mobile communication system, comprising:

at least one data call bearer service which covers several user data rates and which is determined for a mobile subscriber at a subscriber database of a mobile communication network;

a negotiation procedure between a mobile station and a mobile communication network, for negotiating during call set-up, a user data rate used in the data call for data transfer between the mobile station and the mobile communication network;

call control for allocating radio channel resources according to said negotiated user data rate;

a mechanism configured to define the user rate of a second party in the data call; and the call control being arranged, in response to the second party having a lower user rate than said negotiated user rate, to alter the user rate negotiated between the mobile station and the mobile communication network to match the user rate of the second party.

6. A mobile communication system as claimed in claim 5, wherein the call control is arranged to adapt a data call radio channel configuration, allocated on the basis of said negotiated user rate at the beginning of call set-up, according to the user rate of the second party.

7. A mobile communication system as claimed in claim 6, wherein said adapting of the data call radio channel configuration comprises at least one of the following operations: reducing a number of traffic channels allocated for the call, changing a channel coding or a channel type.

8. A mobile conmmunication system as claimed in claim 5, wherein in the negotiation procedure between the mobile station and the mobile communication network, it is also agreed whether the data call will be transparent or non-transparent.

9. A method for establishing a data call in a mobile communication system, comprising:

defining, for a mobile subscriber, at least one of the following data call bearer services, each covering several user rates: an asynchronous bearer service, a synchronous bearer service, a PAD access bearer service, or a packet access bearer service;

carrying out, upon establishing the data call between the mobile communication network and the mobile station, a user data rate negotiation for setting the user data rate to be used in the data transfer between the mobile station and the mobile communication network;

allocating radio channel resources for the data call according to the user data rate negotiated;

continuing call set up to the second party of the data call;

determining the user data rate of the second party in the data call; and adapting radio channel resources allocated on the basis of said negotiated user rate at the beginning of the call set-up, according to the user rate of the second party.

10. A method as claimed in claim 2, further comprising:

defining, for the mobile subscriber, at least one of the following data call bearer services, each covering several user rates: an asynchronous bearer service, a synchronous bearer service, a PAD access bearer service, or a packet access bearer service.

11. A method as claimed in claim 3, further comprising:

defining, for the mobile subscriber, at least one of the following data call bearer services, each covering several user rates: an asynchronous bearer service, a synchronous bearer service, a PAD access bearer service, or a packet access bearer service.

* * * * *